US012005644B2

(12) United States Patent
Klimczak et al.

(10) Patent No.: US 12,005,644 B2
(45) Date of Patent: Jun. 11, 2024

(54) APPARATUS, SYSTEM AND METHOD FOR A HYBRID ADDITIVE MANUFACTURING NOZZLE

(71) Applicant: JABIL INC., St. Petersburg, FL (US)

(72) Inventors: Scott Klimczak, St. Petersburg, FL (US); Luke Rodgers, St. Petersburg, FL (US); Darin Burgess, St. Petersburg, FL (US)

(73) Assignee: JABIL INC.

( * ) Notice: Subject to any disclaimer, the term of this patent is extended or adjusted under 35 U.S.C. 154(b) by 138 days.

(21) Appl. No.: 17/417,042

(22) PCT Filed: Dec. 18, 2019

(86) PCT No.: PCT/US2019/067253
§ 371 (c)(1),
(2) Date: Jun. 21, 2021

(87) PCT Pub. No.: WO2020/132119
PCT Pub. Date: Jun. 25, 2020

(65) Prior Publication Data
US 2022/0072775 A1 Mar. 10, 2022

Related U.S. Application Data

(60) Provisional application No. 62/782,197, filed on Dec. 19, 2018.

(51) Int. Cl.
*B29C 64/209* (2017.01)
*B29C 64/393* (2017.01)
(Continued)

(52) U.S. Cl.
CPC .......... *B29C 64/209* (2017.08); *B29C 64/393* (2017.08); *B33Y 30/00* (2014.12); *B33Y 50/02* (2014.12)

(58) Field of Classification Search
None
See application file for complete search history.

(56) References Cited

U.S. PATENT DOCUMENTS

2012/0080814 A1  4/2012  Sun et al.
2014/0287139 A1  9/2014  Farmer et al.
(Continued)

FOREIGN PATENT DOCUMENTS

DE   102018102731 A1 *  8/2019 ........... B29C 48/266
WO   WO-2018213559 A1 *  5/2017 ............ B29C 47/12
(Continued)

OTHER PUBLICATIONS

Morrison et al., Method and device for the additive production of a workpiece or component of reinforced plastics, 2018, Espacenet, machine translation. (Year: 2018).*

(Continued)

*Primary Examiner* — Jacob T Minskey
*Assistant Examiner* — Adrien J Bernard
(74) *Attorney, Agent, or Firm* — Riverside Law LLP

(57) ABSTRACT

An additive manufacturing apparatus, system, and method. The apparatus, system and method are for a hybrid additive manufacturing print nozzle that may include a delivery conduit; an extruder capable of extruding print material through the delivery conduit; a high thermal mass heater about the delivery conduit proximate to the extruder; a low thermal mass heater about the delivery conduit distal from the extruder and proximate to an exit from the delivery conduit; and a controller capable of executing at least a print build using the print material, and of controlling both the high thermal mass heater and the lower thermal mass heater.

16 Claims, 5 Drawing Sheets

(51) Int. Cl.
    *B33Y 30/00*     (2015.01)
    *B33Y 50/02*     (2015.01)

(56) References Cited

U.S. PATENT DOCUMENTS

| | | | |
|---|---|---|---|
| 2015/0140151 A1* | 5/2015 | Schmehl | B29C 64/112 |
| | | | 425/150 |
| 2017/0203359 A1 | 7/2017 | Pascall et al. | |
| 2017/0252829 A1* | 9/2017 | Sachs | B33Y 50/02 |
| 2019/0022725 A1* | 1/2019 | Bauer | B05B 15/50 |
| 2020/0215755 A1* | 7/2020 | MacNeish, III | H05B 3/28 |

FOREIGN PATENT DOCUMENTS

| | | | | |
|---|---|---|---|---|
| WO | WO-2018170213 A1 * | 9/2018 | | B29C 64/118 |
| WO | WO-2018213559 A1 * | 11/2018 | | B29C 64/106 |

OTHER PUBLICATIONS

International Search Report, dated Jun. 25, 2020 for PCT/US2020/067253.
Written Opinion of the International Searching Authority, dated Jun. 25, 2020 for PCT/US2020/067253.

* cited by examiner

APPARATUS, SYSTEM AND METHOD FOR A HYBRID ADDITIVE MANUFACTURING NOZZLE

CROSS-REFERENCE TO RELATED APPLICATIONS

The present application claims benefit to International Application PCT/US2019/067253, filed Dec. 18, 2019, entitled: "Apparatus, System and Method for a Hybrid Additive Manufacturing Nozzle," which claims priority to U.S. Provisional Application No. 62/782,197, filed Dec. 19, 2018, entitled: "Apparatus, System and Method for a Hybrid Additive Manufacturing Nozzle," the entirety of which is incorporated herein by reference as if set forth in its entirety.

BACKGROUND

Field of the Disclosure

The present disclosure relates to additive manufacturing, and, more specifically, to an apparatus, system and method for a hybrid additive manufacturing print nozzle.

Description of the Background

Additive manufacturing, including three dimensional printing, has constituted a very significant advance in the development of not only printing technologies, but also of product research and development capabilities, prototyping capabilities, and experimental capabilities, by way of example. Of available additive manufacturing (collectively "3D printing") technologies, fused deposition of material ("FDM") printing is one of the most significant types of 3D printing that has been developed.

BOM is an additive manufacturing technology that allows for the creation of 3D elements on a layer-by-layer basis, starting with the base, or bottom, layer of a printed element and printing to the top, or last, layer via the use of, for example, heating and extruding thermoplastic filaments into the successive layers. Simplistically stated, a FDM system typically includes a print head which feeds the print material filament through a heated nozzle to print, an X-Y planar control for moving the print head in the X-Y plane, and a print platform upon which the base is printed and which moves in the Z-axis as successive layers are printed.

More particularly, the FDM printer nozzle heats the thermoplastic print filament received to a semi-liquid state, and deposits the semi-liquid thermoplastic in variably sized beads along the X-Y planar extrusion path plan provided for the building of each successive layer of the element. The printed bead/trace size may vary based on the part, or aspect of the part, then-being printed. Further, if structural support for an aspect of a part is needed, the trace printed by the FDM printer may include removable material to act as a sort of scaffolding to support the aspect of the part for which support is needed. Accordingly, FDM may be used to build simple or complex geometries for experimental or functional parts, such as for use in prototyping, low volume production, manufacturing aids, and the like.

However, the use of FDM in broader applications, such as medium to high volume production, is severely limited due to a number of factors affecting FDM, and in particular affecting the printing speed, quality, and efficiency for the FDM process. As referenced, in FDM printing it is typical that a thermoplastic is extruded, and is heated and pushed outwardly from a heating nozzle, under the control of the X-Y and/or Z driver of a print head/build plate, onto either a print plate/platform or a previous layer of the part being produced. More specifically, the nozzle is moved about at least by the robotic X-Y planar adjustment of the print head in accordance with a pre-entered geometry, such as may be entered into a processor as a print plan to control the robotic movements to form the part desired.

As both the nozzle and the print environment may be heated, and the nozzle is subjected to repeated high-speed movement, non-uniform heating of the nozzle and the print material may occur. Likewise, non-uniform heating within the print nozzle itself may occur. Yet further, movement of the nozzle may, in some instances, cause printing defects, such as stringing or clumping on the nozzle tip, particularly in cases where the nozzle liquefication rate is inadequate to service the X-Y-Z print movements necessary to comply with the print plan.

Thus, and as referenced above, the typical FDM printer necessitates compliance with the print plan by the X-Y-Z stage that generates the layer by layer geometry of a print build in three dimensions; the extruder that drives the filament responsive to the print plan; and the hot end, which includes the nozzle, that is connectively associated with the X-Y-Z movement. The hot end is so-called because it serves to output the print material to the print build, and accordingly also melts the material to allow for printing in accordance with the print plan.

One type of hot end includes, from "top" to "bottom", a heater block which contains the at least partially melted filament in the lower, printing portion of the nozzle, which may include the lower heating portion, such as a simple resistive heater, that heats the lower portion of the nozzle in order to bring the printed filament to the desired temperature to allow for the requisite print speed correspondent to a given portion of the print plan. A heat sink may prevent the liquefied material from "creeping" back up the nozzle. Also typically associated with the hot end is a temperature sensor, such as a thermocouple, such as to provide feedback to the heater control system.

Various hot ends, such as that referenced immediately above, thus typically include either a high and/or low thermal mass area. A high thermal mass portion negates heating of the heat block area absent infusion of significant heat energy, may appreciably slow any heating that occurs in the heat blocked area, and may overshoot a target heat due to the significant heat energy needed to heat the high thermal mass; and a low thermal mass lower portion requires very little energy to allow for heating of the heated portion of the nozzle, and thus allows heating to occur quickly but presents a very broad heat tolerance due to the fact that the low thermal mass portion is overly responsive even to even low amounts of heating energy.

More particularly, some known FDM hot ends may allow for high-speed filament extrusion and printing, typically by providing solely high thermal mass heating areas that are suitable to deliver very significant heating energy to the hot end. However, as referenced above, although such high thermal mass hot ends do allow for significant heating and very broad temperature tolerances, they do not allow for expedited changes in hot end temperature. Accordingly, although such high thermal mass hot ends provide high temperature stability and increased heating capability, they do not allow for rapid changes in print rates, which may vary throughout the print plan.

Other known nozzle heaters may provide varying degrees of heating or heat blocking capability. In short, such printers may provide larger or smaller low thermal mass areas, to thereby enhance (or retard) responsiveness times to applications of heat. However, such hot ends are unsuitable to receive high energy heat, and are thus unsuitable to provide high levels of liquefaction of the print material for high speed printing. Further, such nozzles are often highly unstable with regard to temperature, which, of course, is unsuitable for certain print plans. By way of example, longer nozzles having low thermal mass may allow for increased print speeds, but are difficult to maintain at proper temperature and are difficult to heat to a high heating level.

Thus, known hot ends having high thermal mass are suitable to provide high heating energy for high filament rates and do so within poor temperature tolerances, and are incapable of providing quick changes in print rates. Low thermal mass hot ends do allow for very quick changes in print rate and temperature, but typically lack the capabilities to provide heating energy sufficient to address rapid increases in filament feed rates, and do provide fairly tight temperature tolerance ranges.

SUMMARY

An additive manufacturing apparatus, system, and method are disclosed. The apparatus, system and method are for a hybrid additive manufacturing print nozzle that may include a delivery conduit; an extruder capable of extruding print material through the delivery conduit; a high thermal mass heater about the delivery conduit proximate to the extruder; a low thermal mass heater about the delivery conduit distal from the extruder and proximate to an exit from the delivery conduit; and a controller capable of executing at least a print build using the print material, and of controlling both the high thermal mass heater and the lower thermal mass heater.

The embodiments thus provide a high thermal mass suitable to provide high heating energy for high filament rates within broader temperature tolerances, and a low thermal mass hot end suitable for very quick changes in temperature, and suitable to further refine the temperature tolerances of the high thermal mass heater.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
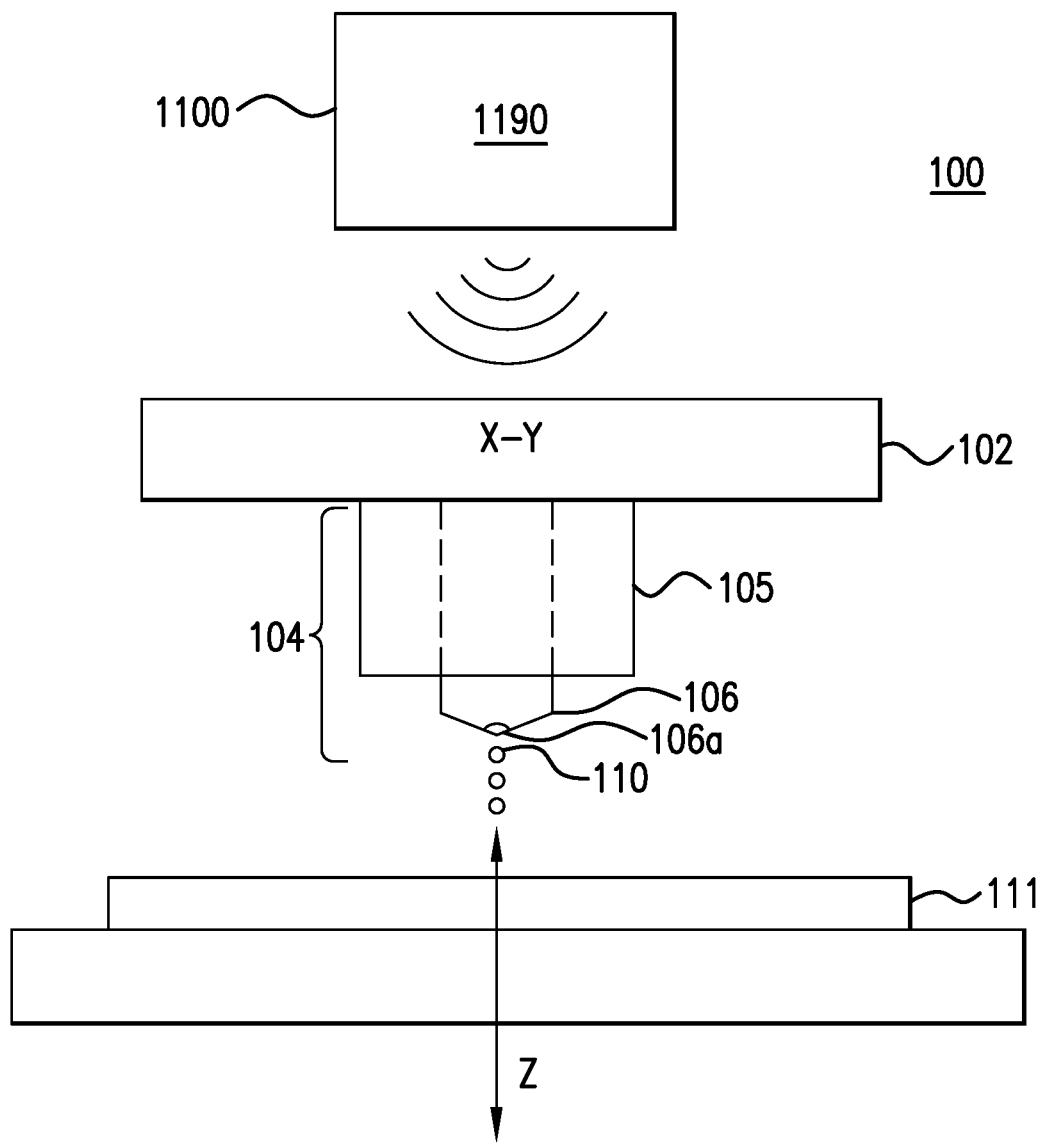
FIG. 1 is an illustration of an additive manufacturing printer.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The embodiments provide an additive manufacturing nozzle subjected to hybrid heating, which hybrid heating combines a high thermal mass area and a low thermal mass area in a single lower portion of a hot end of a print nozzle. As used herein, thermal mass is defined as the ability of a material to absorb and store heat energy. Thermal mass may be mathematically defined as:

$$Q = Cth \times \Delta T;$$

wherein Q is thermal energy transferred, Cth is thermal mass of the material, and $\Delta T$ is the change in temperature of the material.

As such, a significant amount of heat energy is required to change the temperature of a material having a high thermal mass, and accordingly the disclosed high thermal mass area may consume more significant energy to heat a print filament than does the disclosed low thermal mass portion. That is, less substantial heat energy is required to change the temperature of materials having low thermal mass, such as the disclosed low thermal mass portion, i.e., the low thermal mass portion is thus more highly responsive.

FIG. 1 is a block diagram illustrating an exemplary filament-based printer 100. In the illustration, the printer includes an X-Y- and/or Z axis driver 102 suitable to move the print head/hot end 104, and thus the print nozzle 106 on the print head 104, in a two dimensional plane, i.e., along the X and Y axes, responsive to the print plan 1190. Further included in the printer 100 for additive manufacturing is the aforementioned print head 104, including print nozzle 106 with heater 105.

As is evident from FIG. 1, printing may occur upon the flow of print material heated by heater 105 outwardly from the nozzle 106 along a Z axis with respect to the X-Y planar movement of the X-Y- and/or Z axis driver. Thereby, layers of printed material 110 may be provided from the nozzle 106 onto the print build 111 via the Z-axis along a path dictated by the X-Y driver 102.

Figure 2:
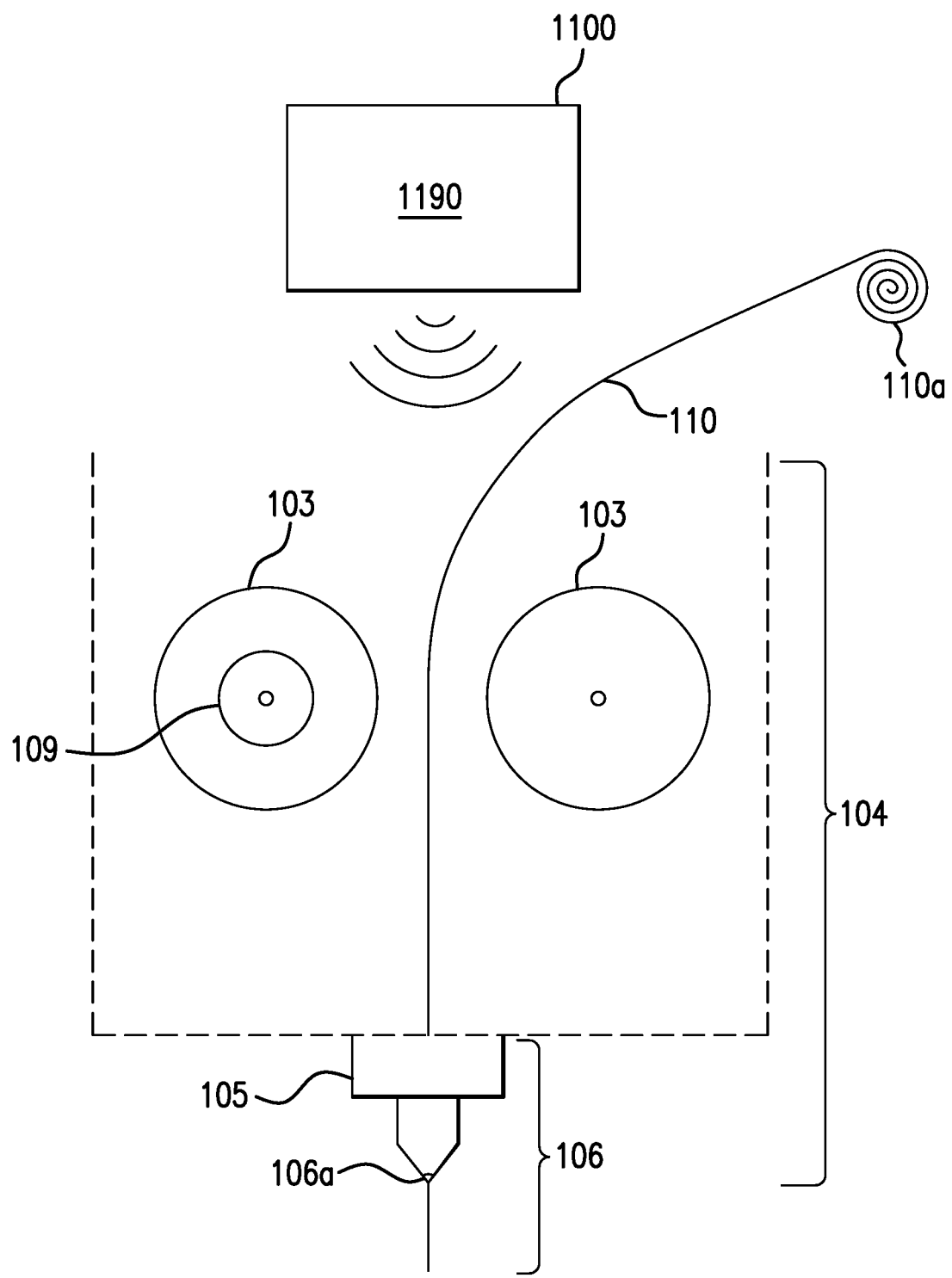
FIG. 2 is an illustration of an exemplary additive manufacturing system.

More particularly and as illustrated in FIG. 2, filament-based 3D printers generally include an extruding print head 104 that uses the hobs 103 to move the filament 110 into the heated nozzle 106, i.e., past heater 105 about nozzle 106, at a feed rate tied to the controller 1100 executing the print plan algorithm 1190 via the X-Y-Z axis driver 102 (shown in FIG. 1). A motor 109 is generally used to drive at least one of the hobs 103, such as against an undriven one of the hobs 103. This extrusion and X-Y-Z movements are made responsive to the print plan 1190 executed by controller 1100.

As illustrated, the print material 110 is extruded via hobs 103 of the head 104 from a spool of print material 110a into and through the heated nozzle 106, and thus past heater 105, responsively to print plan 1190. More particularly, as the nozzle 106 heats the print material 110 using heater 105, the print material is at least partially liquefied for output from an end port/tip 106a of the nozzle at a point along the nozzle distal from the print head 104 onto the print build 111 (shown in FIG. 1). Thereby, the extruded material is "printed" outwardly from the port 106a via the Z axis along a X-Y planar path determined by the X-Y driver (see FIG. 1) connectively associated with the print head 104.

Figure 3:
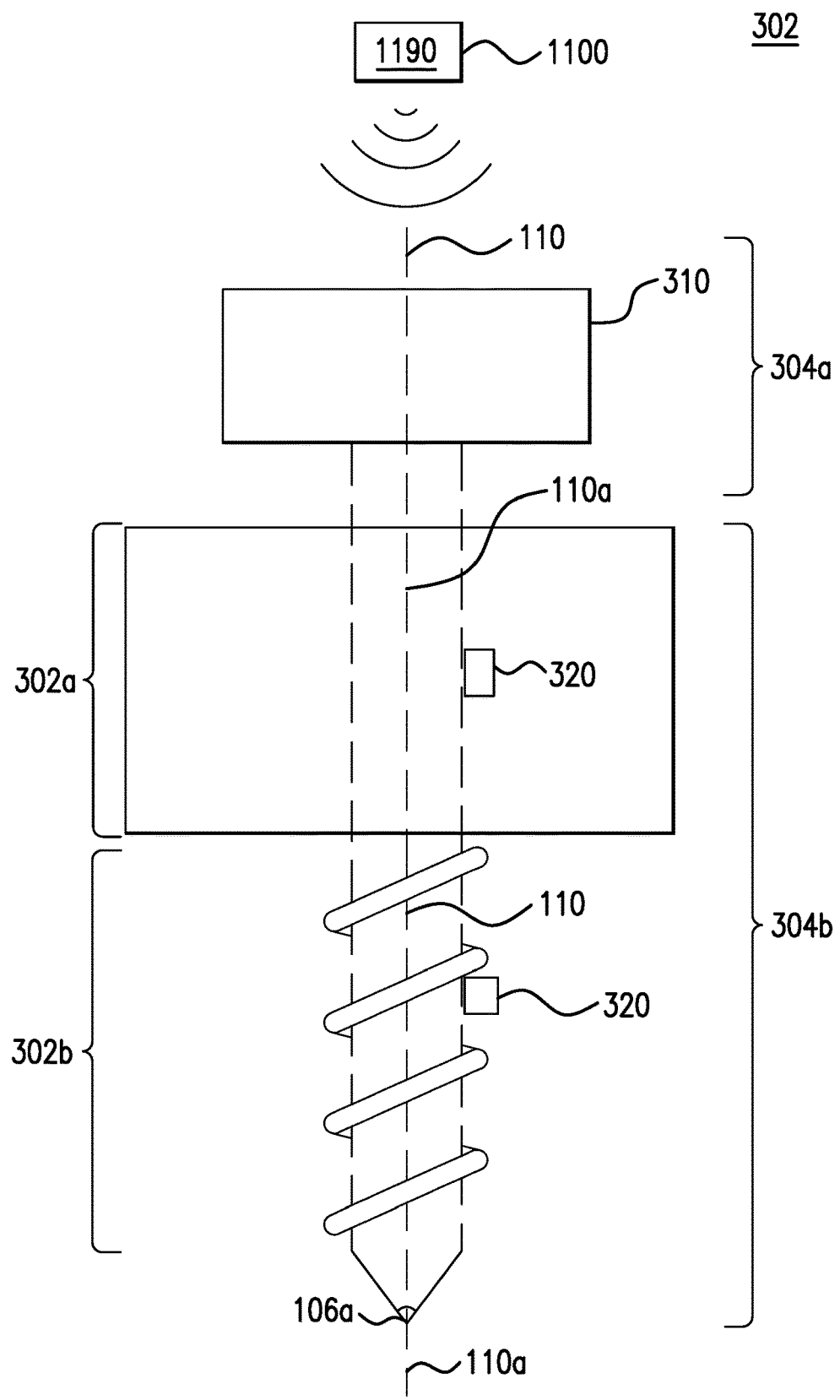
FIG. 3 illustrates a hybrid print nozzle.

As illustrated in FIG. 3, an upper region heater 302a of the lower portion 304b of a hybrid heater print nozzle 302 (herein used to reference a combination of a hybrid one of heater 105 on a nozzle 106) is suitable to provide substantial heat energy to the print filament 110 within the nozzle 302, such as to allow for the nozzle 302 to address rapid flow rates by providing enhanced liquefaction. This upper region thus may comprise a high thermal mass heating area/heater 302a which may reside, for example, along the nozzle "below" the typical high thermal mass heat sink 310 included in known hot ends. Such a heat sink 310 may typically prevent "creep" of liquefied print material 110a "upwardly" through the nozzle 302, such as to prevent clogging, as will be understood to the skilled artisan.

The high thermal mass area/heater 302a provided on the nozzle 302 in the embodiments thus is suitable to provide significant heating for print plan aspects 1190 requiring high print rates. Moreover, and as discussed throughout, this high thermal mass area 302a also provides relatively tight tolerances for print material temperature.

Of note, the heating capabilities of high thermal mass portion 302a may be dependent not only on the equation stated above, but may additionally be dependent upon the size and/or geometry of the high thermal mass portion 302a. For example, a high thermal mass portion 302a with a larger volume has a higher thermal mass than a heater with a smaller volume of the same material. Likewise, a high thermal mass portion with an elongated geometry may provide more substantial heat energy to filament 110, at least because of the increased exposure time of filament 110 within nozzle 302 to an elongated high thermal mass portion 302a as compared to a non-elongated high thermal mass portion 302a.

Also illustrated in FIG. 3 is a low thermal mass nozzle area/heater 302b, along the nozzle 302 "below" the high thermal mass nozzle portion 302a discussed above. This low thermal mass nozzle area 302b allows for dynamic changes in the temperature of the nozzle 302 (and thus of filament 110 within the nozzle), and, unlike known imprecise low thermal mass nozzle heaters, may employ its low thermal mass properties to enable highly precise thermal control of the temperature print material 110 pursuant to print plan 1190. The enhanced precision provided by the low thermal mass portion 302b in the disclosed hybrid nozzle 302 occurs because the print material 110 incoming from the high thermal mass nozzle area 302a to the low thermal mass portion 302b may have been substantially or completely preheated by that high thermal mass area 302a to the necessary liquefaction level for that filament 110, in accordance with the print plan 1190.

That is, the high thermal mass nozzle portion 302a may provide substantially narrow, but still non-zero, temperature tolerances for the print material 110, as will be understood to the skilled artisan, and so the low thermal mass nozzle portion 302b may provide not only improved temperature tolerances over the low thermal mass nozzles of the known art, but also improved temperature tolerances even over the high thermal mass heaters of the known art. The foregoing is the case at least in that the low thermal mass portion 302b of the disclosure needs only provide refinement to temperature of the print material 110 imparted by the high thermal mass portion 302a (because the high thermal mass portion 302a has already substantially provided for the temperature needs of print plan 1190). As such, the low thermal mass lower nozzle portion 302b may be employed for expedited adjustments of print material temperature, and, in some embodiments, these adjustments may be made within the broader temperature tolerances typically available from high thermal mass heaters. Thereby, in combination, the low and the high thermal mass nozzle portions 302b, 302a may address the drawbacks typical of exclusively low thermal mass nozzles, and may improve the already narrow tolerances of exclusively high thermal mass nozzles, in the known art.

Thereby, the disclosed hybrid nozzle 302 provides a high thermal mass area 302a suitable to provide sufficient heat energy to bring the filament 110 to or substantially to liquefaction in an accelerated time frame. The print material 110 entering the low thermal mass portion 302b, which may be, for example, a NiChrome portion, is thus already within a given range proximate to the optimum temperature required by a given aspect of the print plan 1190. Accordingly, the low thermal mass area/heater 302b needs only control the variance in the temperature imparted by the high thermal mass area 302a, such as by refining the high thermal mass area temperature tolerance; and/or needs only make small adjustments to the print material temperature output from the high thermal mass area 302a to reach the indicated temperature of print plan 1190.

One or more sensors 320 may be provided in conjunction with nozzle 302, such as in conjunction with at least the high and low thermal mass portions 302a, b. These sensors 320 may sense and convey temperature information associated with portions of the nozzle 302, or with the print material 110 flowing through the nozzle. The sensor data may be conveyed to controller 1100, such as to allow for modification of the heat energy delivered by either or both heating portions 302a, b, such as to insure efficient compliance with print plan 1190.

The embodiments thus provide the ability to accelerate and decelerate print filaments 110, and thus printing, during printing at faster rates than in the known art without or substantially without temperature overshoot or undershoot. Further, as the embodiments provide the advantages of both high thermal mass heaters and low thermal mass heaters in a single nozzle, the ability to reach a higher steady state velocity of the filament 110 with precision is also provided.

Figure 4:
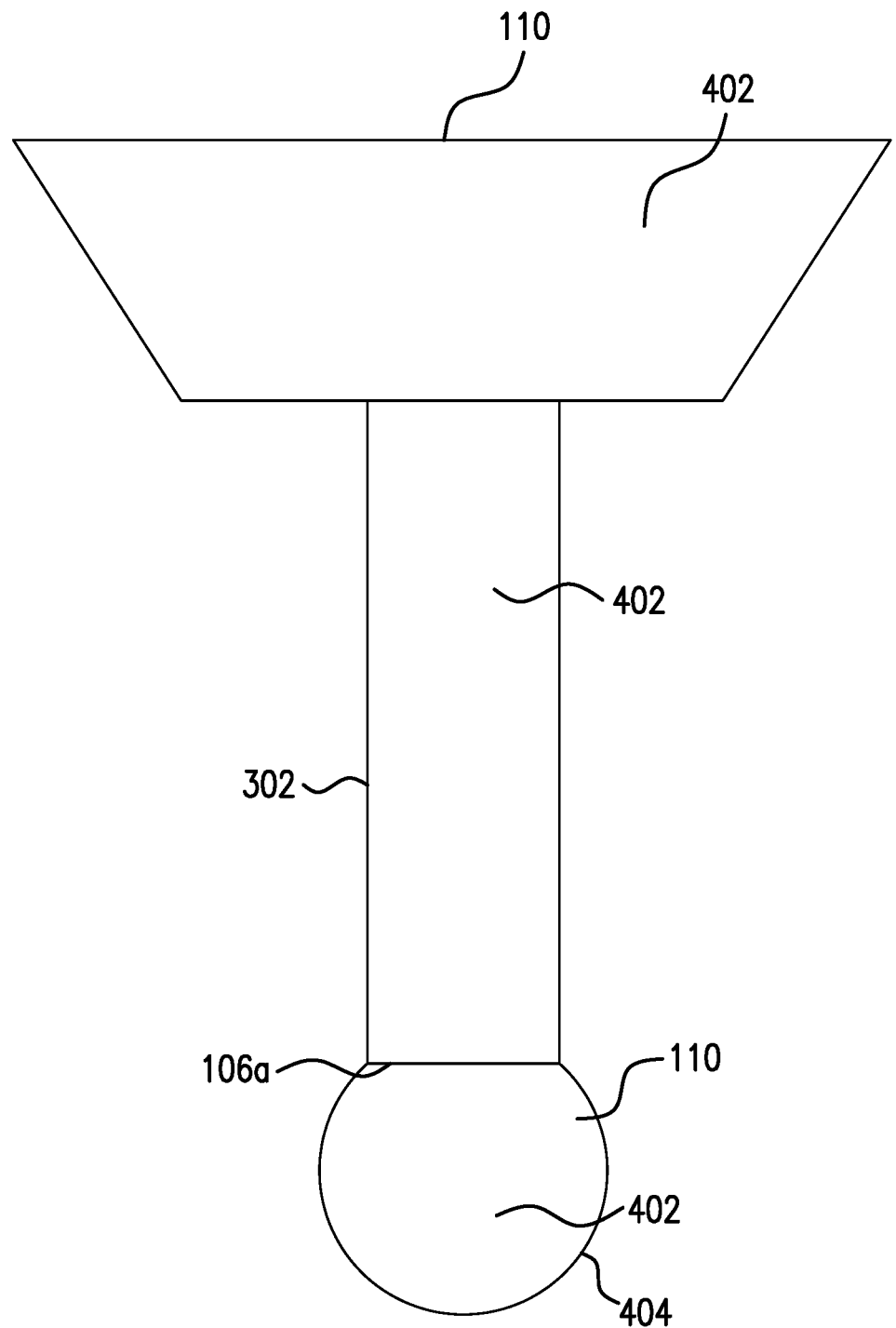
FIG. 4 is an illustration of a print nozzle die swell.

Moreover, known art printer nozzles frequently experience "die swell" upon significant print rate accelerations. Die swell is a condition in which the narrowing aspects of the print nozzle lengthen the polymer conformations of the print material during increased flow rate, as illustrated in FIG. 4. These modified polymers 402 may cause a "swell" 404 as the print material 110 exits from the nozzle tip 106a. This condition may cause numerous disadvantages in additive manufacturing, such as misprints, stringing, clogging, dripping, and the like. The foregoing disadvantages stem from the fact that nozzle bead output size/nozzle tip size is typically selected with particularity for a given print, and thus, the modification in nozzle output bead size due to "die swell" causes incorrect and unexpected print bead output, which causes a lack of compliance with the print plan.

However, the hybrid nozzle 302 disclosed herein provides less swell, less drip, and fewer disadvantages than does the known art, in large measure due to the capability of the hybrid nozzle to adjust temperatures very quickly, and with far tighter temperature tolerances, than in the known art. Needless to say, these capabilities of the embodiments substantially improve compliance with, and available complexities of, a print plan 1190 over the known art.

By way of example, improved print plan compliance at higher speed print rates enables higher complexity print builds, and printing of complex builds in less time, using the disclosed hybrid nozzle 302. In a particular example, a typical high thermal mass print nozzle in the known art experiences swell upon adjustment to a 5 mm per second print rate; a typical low thermal mass print nozzle in the known art experiences swell upon adjustment to a 5 mm per second print rate; however, the disclosed hybrid nozzle avoids swell until adjustment to feed rates well above 5 mm per second, such as in the range of 10 to 11 mm per second or more. Needless to say, a doubling of available feed rate accelerations over the known art, without a likelihood of die swell, allows the embodiments to execute more complex print plans more quickly than in the known art.

It will also be understood by the skilled artisan in light of the discussion herein that the disclosed hybrid nozzle 302 may also provide print rate deceleration/cooling in an improved manner over the known art. By way of non-limiting example, the cooling of the print material provided may be active or passive. That is, the low thermal mass portion 302b of the nozzle may be cooled, such as by an active cooler, or such as by a simple decrease in the heat provided to the low thermal mass nozzle portion 302b. Because the low thermal mass heater and portion 302b is highly responsive, the cooling of the print material thus occurs very rapidly in the low thermal mass portion 302b.

The aforementioned enhanced cooling allows for temperature refinement very quickly and within very narrow tolerances as compared to the known art, which further reduces drip and die swell, and which also further improves the available temperature tolerances at the nozzle output 106a. This enhanced and refined cooling (and heating) also allows for enhanced print plan complexities without a corresponding decrease in print build speed, contrary to the known art.

Yet another advantage provided by the disclosed hybrid nozzle 302 is that the referenced higher filament feed rates may be achieved with less loading on the extrusion motor 109 discussed above. That is, refined and expedited temperature controls on the print material 110 enable the use of a lower push forces, and thus less motor current, than is needed in the known art.

The aforementioned advantages of the disclosed hybrid nozzle 302 may also enable other advantageous aspects, such as substantial elimination of material buildup inside the nozzle 302 and at the nozzle output point 106a, which occurs in the known art due to lack of refined temperature controls on the print material 110. This elimination of buildup, of course, provides improved lifetime for the disclosed nozzle 302 over the nozzles of the known art.

In accordance with the foregoing, the high thermal mass nozzle portion 302a may allow for full melt, or substantial melting, of one or more types of print material 110. By way of example, the high thermal mass portion 302a may provide 90% of the energy needed to raise the temperature of the print material 110 to transition to a liquid state, and the low thermal mass portion may thus provide only 10% of the required energy to reach full melt. As such and in an exemplary embodiment with a target full melt temperature of 150 C, the high thermal mass portion 302a may bring the filament 110 to 135 C, i.e., 90% of 150 C; and the low thermal thermal mass portion thus heats the filament only by the remaining 15 C to reach the target 150 C melt temperature.

In another example with a 150 C target temperature, the high thermal mass portion 302a may supply 100% of the energy needed to raise the temperature of the filament 110 to a temperature of 150 C, but may do so within a 3% tolerance. Accordingly, the low thermal mass portion 302b may, in this example, either heat or cool the filament by up to 4.5 C, i.e., to "cure" the +/−3% tolerance of the high thermal mass portion 302a.

Of course, the contribution of the low thermal mass portion 302b may vary in different applications. For example, to the extent it is desired in a given application for the physical length of the disclosed hybrid nozzle 302 to be shorter, such as given a confined work area, the low thermal mass portion 302b may contribute not only to temperature refinement, but also to liquefaction for given aggressive feed rates, as referenced above. That is, in certain circumstances and applications, more heating energy may be provided to the low thermal mass nozzle portion 302b in order that the low thermal mass nozzle portion may increasingly participate in the print material heating; but, even in such cases, the heat energy savings effectuated by not providing the greater amount of energy to provide the same temperature change from the high thermal mass portion 302a may outweigh any drawbacks of the increased participation in melting provided by the low thermal mass portion 302b (recalling that the high thermal mass portion 302a consumes more energy than the low thermal mass portion 302b). Of course, it will be appreciated, in light of the discussion herein, that while the low thermal mass portion 302b may be a designed-for participant in active melting in certain applications, in other applications it may not participate in melting, but rather may serve to maintain or even cool the print material 110, as discussed throughout.

Thus, the disclosed hybrid nozzle 302 may be, but needn't be, designed for full melt, or a target percentage melt, of a specific family or type of print filaments 110, such that the high thermal mass portion 302a may be optimized for the specific filament requirements of those filaments 110. In the embodiments, the low thermal mass portion 302b may then be used to refine the melting provided by the high thermal mass portion 302a, and may do so by consuming significantly less heating energy than is necessary in known low thermal mass nozzles. However, the skilled artisan will understand, in light of the discussion herein, that the inclusion of both a high thermal mass nozzle portion 302a and a refining low thermal mass nozzle portion 302b may also allow for the disclosed hybrid nozzle 302 to be non-specific to any family of filaments, at least in that the high thermal mass and low thermal mass areas 302a, b, in combination, may be suitable to provide a wide range of a highly varying print material temperatures which are also adjustable at the high rates discussed herein.

Moreover, in accordance with the embodiments, the high thermal mass portion 302a may be suitable to address the most aggressive specific or nonspecific filament feed rates, including a highly aggressive acceleration and deceleration of such feed rates. Even in aggressive circumstances, the low thermal mass portion 302b of the hybrid nozzle 302 may provide highly refined control of the print material temperature. By way of non-limiting example, the low thermal mass portion 302b may provide temperature control in a range of plus or minus 1° C. or less of a given temperature set point, even at higher feed rates, which set point is substantially imparted by the high thermal mass portion 302a.

Figure 5:
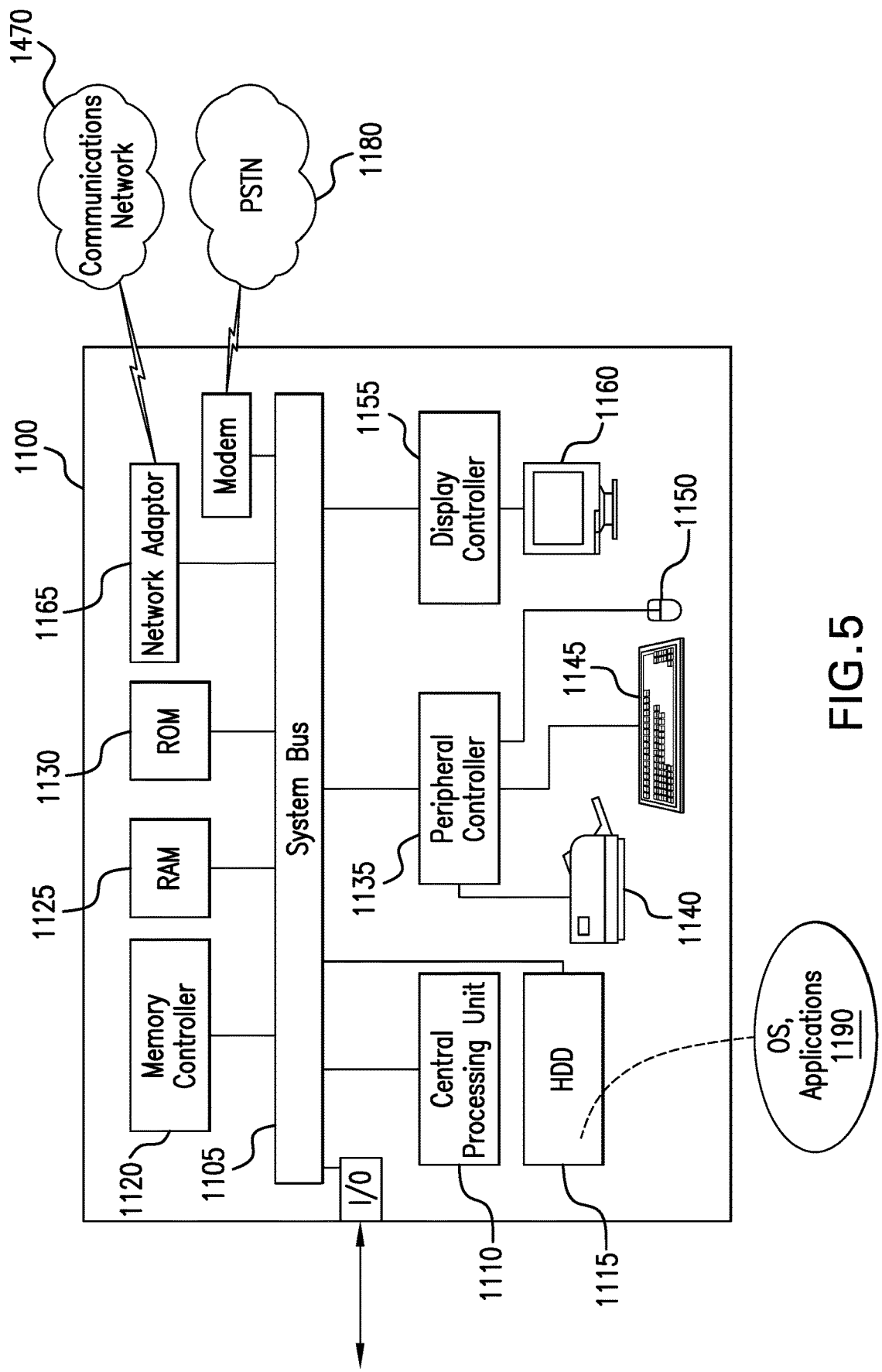
FIG. 5 illustrates an exemplary computing system

FIG. 5 depicts an exemplary computing system 1100 for use as the controller 1100 in association with the herein described systems and methods. Computing system 1100 is capable of executing software, such as an operating system (OS) and/or one or more computing applications/algorithms 1190, such as applications/algorithms including and applying the print plan and the temperature variations 1190 (including temperature variations and tolerances corresponded to varying feed rates in anticipation of those feed rates) discussed herein throughout.

The operation of exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1470 or some other data communications means.

In operation, CPU 1110 fetches, decodes, and executes instructions from a computer readable storage medium, such as HDD 1115. Such instructions may be included in software such as an operating system (OS), executable programs, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 1135, which is responsible for communicating instructions from CPU 1110 to, and/or receiving data from, peripherals, such as peripherals 1140, 1145, and 1150, which may include printers, keyboards, and/or the sensors, encoders, and the like discussed herein throughout. An example of a peripheral bus is the Peripheral Component Interconnect (PCI) bus.

Display 1160, which is controlled by display controller 1155, may be used to display visual output and/or presentation generated by or at the request of computing system 1100, responsive to operation of the aforementioned computing program. Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1470, which may include or provide access to the Internet, an intranet, an extranet, or the like. Communications network 1470 may provide user access for computing system 1100 with means of communicating and transferring software and information electronically. Additionally, communications network 1470 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1470 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An additive manufacturing print nozzle, comprising:
   a delivery conduit;
   an extruder capable of extruding print material through the delivery conduit;
   a high thermal mass heater about the delivery conduit proximate to the extruder;
   a low thermal mass heater about the delivery conduit distal from the extruder and proximate to an exit from the delivery conduit; and
   a controller capable of executing at least a print build using the print material, and of controlling both the high thermal mass heater and the low thermal mass heater.

2. The nozzle of claim 1, wherein the controlling is substantially simultaneous.

3. The nozzle of claim 1, wherein the high thermal mass heater liquefies the print material by large temperature increase and the low thermal mass heater adjusts a temperature of the print material in small increments.

4. The nozzle of claim 3, wherein the temperature refinement is in a range of +1-1 degree C.

5. The nozzle of claim 1, further comprising at least two sensors, at least one being corresponded to the low thermal mass heater and at least one being corresponded to the high thermal mass heater.

6. The nozzle of claim 5, wherein the controller controls responsively at least to data from the at least two sensors.

7. The nozzle of claim 6, wherein the data from the at least two sensors comprise a feed rate from the extruder.

8. The nozzle of claim 6, wherein the data from the at least two sensors comprise energy delivered to the low thermal mass heater.

9. The nozzle of claim 6, wherein the data from the at least two sensors comprise energy delivered to the high thermal mass heater.

10. The nozzle of claim 1, further comprising at least one heat sink more proximate to the extruder than the high thermal mass heater.

11. The nozzle of claim 10, wherein the heat sink prevents reverse flow of the print material.

12. The nozzle of claim 1, wherein the low thermal mass heater comprises a nichrome heater.

13. The nozzle of claim 1, wherein the controller comprises a correlation of feed rates to high thermal mass heater temperatures.

14. The nozzle of claim 1, wherein the controller comprises a correlation of feed rates to low thermal mass heater temperatures.

15. The nozzle of claim 1, wherein the extruder comprises at least one motor, and wherein a load on the at least one motor is decreased by actuation of both the high and the low thermal mass heater.

16. The nozzle of claim 1, wherein liquefication of the print material is partially provided by the low thermal mass heater, and is partly provided by the high thermal mass heater.

* * * * *